United States Patent
Nieslony

[11] Patent Number: 6,161,282
[45] Date of Patent: Dec. 19, 2000

[54] PROCESS AND DEVICE FOR THE ELECTRICAL CONNECTION OF TWO ELECTRICAL COMPONENTS TO EACH OTHER

[75] Inventor: Markus Nieslony, Salach, Germany

[73] Assignee: Robert Bosch GmbH, Stuttgart, Germany

[21] Appl. No.: 08/776,951

[22] PCT Filed: Jun. 5, 1996

[86] PCT No.: PCT/DE96/00983

§ 371 Date: Feb. 13, 1997

§ 102(e) Date: Feb. 13, 1997

[87] PCT Pub. No.: WO97/04941

PCT Pub. Date: Feb. 13, 1997

[30] Foreign Application Priority Data

Jul. 25, 1995 [DE] Germany ............... 195 27 123

[51] Int. Cl.[7] ............... H01R 43/02; H01R 13/62; B29B 15/14

[52] U.S. Cl. ............... 29/860; 29/877; 29/878; 29/747; 29/748; 439/596; 439/467; 439/499; 264/272.11; 264/273

[58] Field of Search ............... 29/860, 877, 878, 29/879, 747, 748, 753; 439/596, 456, 467, 499, 492, 494, 876; 264/272.11, 273

[56] References Cited

U.S. PATENT DOCUMENTS

| | | | |
|---|---|---|---|
| 3,550,066 | 12/1970 | Cootes | 439/494 |
| 3,650,024 | 3/1972 | Finney | 29/615 |
| 4,196,510 | 4/1980 | Gudmestad et al. | 29/860 |
| 4,225,205 | 9/1980 | Sinclair et al. | 439/467 |
| 4,389,083 | 6/1983 | Normann et al. | 439/456 |
| 4,558,916 | 12/1985 | Hehl | 439/467 |
| 4,621,880 | 11/1986 | Rush | 439/876 |
| 4,771,534 | 9/1988 | Gellert et al. | 29/879 |
| 4,776,803 | 10/1988 | Pretchel et al. | 439/59 |
| 4,834,662 | 5/1989 | Schempp et al. | 439/876 |
| 4,993,968 | 2/1991 | Gulesky et al. | 439/492 |
| 5,343,605 | 9/1994 | Nazerian et al. | 29/747 |
| 5,344,338 | 9/1994 | Colleran et al. | 439/499 |
| 5,516,984 | 5/1996 | Soes et al. | 439/467 |
| 5,607,321 | 3/1997 | Schock et al. | 439/499 |
| 5,724,730 | 3/1998 | Tanaka | 29/860 |
| 5,780,774 | 6/1998 | Ichikawa et al. | 439/499 |

FOREIGN PATENT DOCUMENTS

| | | |
|---|---|---|
| 0 335 051 | 4/1989 | European Pat. Off. . |
| 0 437 659 | 7/1991 | European Pat. Off. . |
| 1-19685 | 1/1989 | Japan ............... 439/876 |

*Primary Examiner*—Lee Young
*Assistant Examiner*—A. Dexter Tugbang
*Attorney, Agent, or Firm*—Ronald E. Greigg; Edwin E. Greigg

[57] ABSTRACT

A device and process for electrically connecting two electrical components or devices to each other by means of electrical, flexible conductors, in which the electrical conductors are prefabricated and then connected by means of a welding or soldering process to corresponding electrical connections of the component. In particular, a process and a device are for fixing the conductor ends and achieving an easy-to-handle embodiment of the conductor ends for producing the connection.

16 Claims, 2 Drawing Sheets

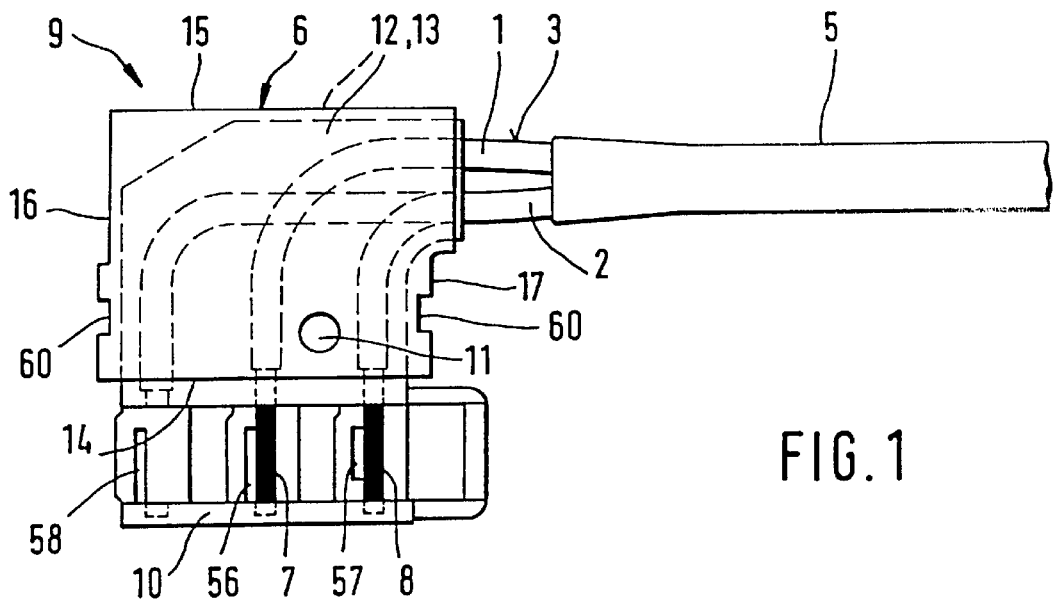
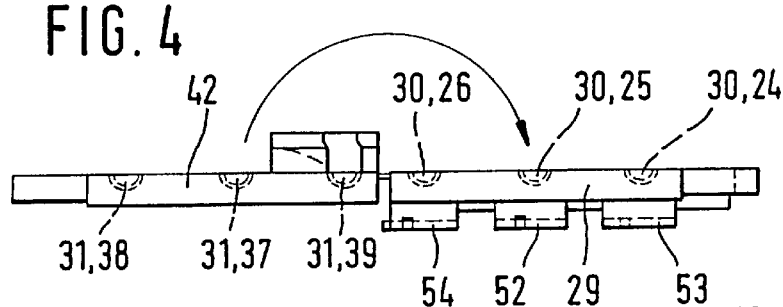
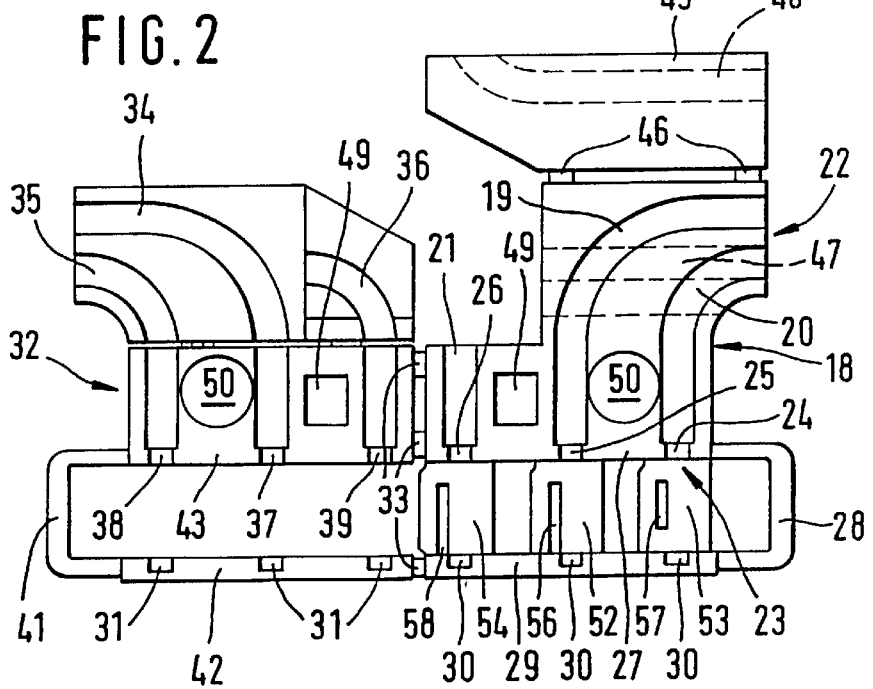
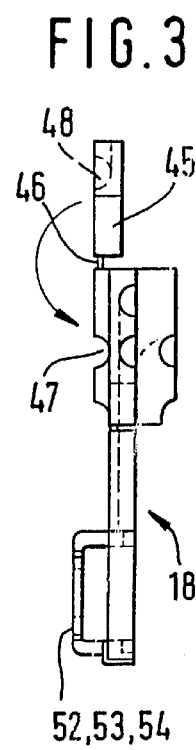

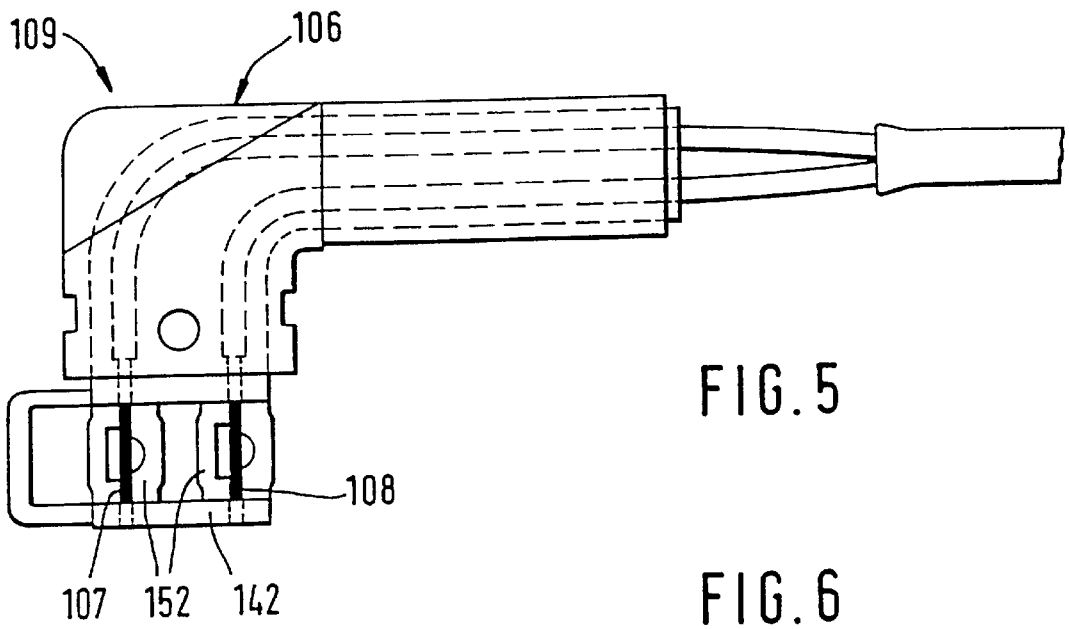
FIG. 5
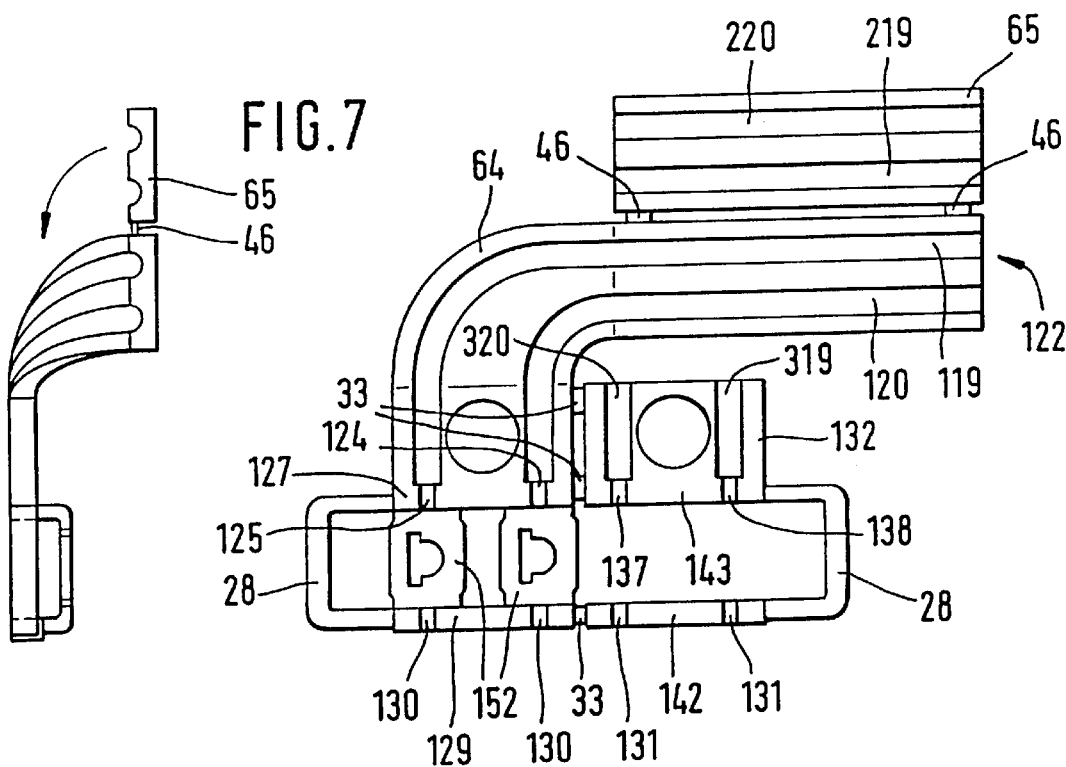
FIG. 6
FIG. 7
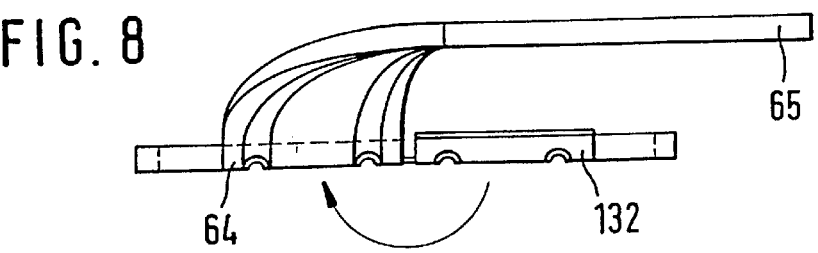
FIG. 8

PROCESS AND DEVICE FOR THE ELECTRICAL CONNECTION OF TWO ELECTRICAL COMPONENTS TO EACH OTHER

PRIOR ART

It is known to connect electrical components or devices with one another by means of flexible electric conductors in order to be able to embody the proper functioning of the devices. This is true for the powering of the devices as well as for the transmission of control currents. In particular in electrical components and devices which are placed in motor vehicles and are subjected to increased jolting and vibrational stresses, it is a problem to produce a lasting, perfectly conductive connection between the conductor and the respective device. Very costly plug connections can be used for this, with which a detachable connection can be produced.

ADVANTAGES OF THE INVENTION

Because of the process according to the invention for electrically connecting two electrical components with each other, the problem of the reliable electrical connection is solved by virtue of the fact that the electrical conductors are soldered or welded to the electrical connections of the device and consequently a non-detachable connection is produced, which can also withstand high stresses. At the same time, subassemblies can also be advantageously prefabricated with regard to their electrical connection to one another via electrical conductors and in this preassembled state, can be brought into their final position inside the motor vehicle or in a fuel injection pump, for example. This simplifies the assembly outlay, reduces assembly costs, and produces a reliable, lasting, electrically conductive connection.

In an advantageous improvement, the production of the electrical connection is produced in an easy-to-assemble and reliable manner by soldering or by a welding process. After being fixed, the conductor ends, which are compressed, can be reliably and easily connected to the electrical connections via a soldering or welding process.

A securing frame is advantageously used for the preassembly of the end region of the conductors to be injection molded and fixes the position of the conductor ends so they are detachable for the time being, before the injection molding with plastic. After this fixing, the securing frame, along with the conductors disposed in it, can easily be injection molded inside an injection molding tool, with the exception of the conductor ends to be contacted. Then, the part produced by injection molding, together with the conductor ends, is advantageously conveyed to the soldering or welding process and furthermore, mechanically fixed in a reliable manner in the final position by connecting means.

A securing frame is advantageously provided for carrying out the process embodied above. The fact that it is made of two parts makes it very easy to insert and cast the conductors into the securing frame, where in a particularly advantageous manner, a right-angled deviation of the conductors from their conductor ends to the continuing cable part can also be produced. Securing elements in the securing frame or in the securing part are advantageously used for this and are embodied in the form of a groove whose cross section is adapted to the cross section of the conductor. However, only partial boundaries can also be provided, which have the advantage that in the subsequent injection molding, the conductors can be more intensively enclosed with plastic and fixed in place.

In an advantageous manner, the axial positions of the conductor ends are also fixed by securing elements of the securing frame. It is assured that the entire volume of the part produced by the injection molding is filled up to the conductors with plastic. The common intermediary piece is formed to close this volume, via which it is assured that the stripped conductor ends are excepted from the injection molding. The common intermediary piece constitutes the closure of the injection molding form (injection molding tool). Because of the compression of the conductor ends, in particular when the conductors are comprised of strands, a desired cross section can be produced, which can be polygonal, but is preferably circular. Despite the rigidity of the conductors already produced by the compression, the embodiment then also advantageously offers an additional fixing of the conductor ends so that they assume a secured position for the connecting process with the connections of the electrical component. In addition, a precise axial position of the conductor ends can also be fixed, which can then be closed on the end face by means of the recesses of the limiting piece.

To make assembly easier, the securing frame and securing part are made of plastic and are connected to each other by means of at least one folding plastic hinge. A number of securing parts on the securing frame can also be provided, which at various points on the securing frame, work together with it to fix the conductors in position.

In addition, guide pieces can be advantageously provided between the securing part or securing frame and the limiting piece, by means of which the supply of the electrical connections of the component or device to be attached to the conductor ends is made possible in a position-secured manner. As a result, the connecting process can be carried out in an even more assembly-friendly and reliable manner in the form of welding or soldering.

BRIEF DESCRIPTION OF THE DRAWINGS

Two exemplary embodiments of the invention, particularly with regard to the device for fixing the position of stripped conductor ends, are shown in the drawings and explained in detail in the following description.

FIG. 1 shows a ready-made injection molding of two electrical conductors as a connecting piece for further connection with the electrical component, FIG. 2 shows a top view of a securing frame for the initial position fixing of the conductors, together with securing parts connected to this via folding plastic hinges, when the securing parts are opened, FIG. 3 shows a top view, pivoted by 90°, of the narrow end of the securing frame according to FIG. 2, FIG. 4 shows a top view of a narrow end of the securing frame, pivoted around the longitudinal axis of the securing frame according to FIG. 2, FIG. 5 shows a second exemplary embodiment with a ready-made injection molding of the conductors according to the exemplary embodiment in FIG. 1, FIG. 6 shows a second embodiment of the securing frame, which is used in the embodiment according to FIG. 5, with securing elements likewise connected to it via folding plastic hinges, FIG. 7 shows a top view of the narrow end of the securing frame according to FIG. 6, pivoted around its vertical axis, and FIG. 8 shows a top view of the securing frame, pivoted around the lateral axis.

DESCRIPTION OF THE EXEMPLARY EMBODIMENTS

FIG. 1 shows the positioning and fixing of the conductor ends of two electrical conductors 1 and 2 for a first exemplary embodiment, which positioning and fixing are produced according to the invention. The electrical conductors are strands covered with an insulation 3 and for further insulation and positioning, have another covering 5 of the kind used in electrical cables. The electrical conductors 1 and 2 that lead out from the covering 5 are enclosed by an injection molded part 6 that is comprised of plastic or insulating material. Inside this injection molded part, which represents a connecting piece 9 in the form of a manipulable plastic block, the individual conductors extend in an orientation provided in such a way that they run in an arc shape inside the injection molding and the individual conductors re-emerge from this injection molded part 6 parallel to one another. Outside the injection molded part, the conductors have stripped conductor ends 7 and 8, which have been compressed in a manner not shown in detail here into a square, rectangular, or circular cross section in such a way that prevents a splaying of the individual wire strands. This compression can be carried out in a known manner by virtue of the fact that soldered wire strands are pressed against one another under the influence of ultrasound and consequently undergo a metallic connection with one another while retaining the desired cross section. The same thing can also be achieved by means of resistance heating. The conductor ends are advantageously compressed in this manner until they are inside the injection molding, with the advantage that the breakage-prone transition between the compression and the normal strand is no longer subjected to any mechanical deforming because of the fixing inside the injection molded part. Consequently, damage due to deformation can be reliably prevented.

On their outermost end faces, the conductor ends 7 and 8 are fixed inside a limiting piece 10 so that their position with regard to the injection molding is protected against arbitrary bending and in particular, the tips of the conductor ends are also protected against damage on the end face. The plastic injection molding has the form of a rectangular block with two large-surfaced, essentially rectangular side pieces 12 and 13 disposed opposite each other and narrow ends 14, 15, 16, and 17, which connect these side pieces. A through opening 11 in the form of a through bore leads from the side piece 12 to the side piece 13, running crosswise to the conductors. This is used to guide through a screw, for example, which is used to fasten the injection molding 6 in its place of installation. This installation place can be the element, control device, or component to be electrically connected, or its housing or installation place.

The embodiment of the connecting piece 9 with the end regions of the conductors 1 and 2, there can also be more, is embodied, as can be inferred from FIG. 1, in the form of a plug, without being a plug itself. To produce this ready-made embodiment, a securing frame 18 is used, which is shown in detail in FIGS. 2 to 4. As explained above, the conductors have compressed conductor ends. For the production of the connecting piece, the conductors coming out of the covering 5 are cut to their required lengths before the compression. Then, the conductors are inserted into the securing frame 18. This securing frame has grooves 19, 20, and 21 as securing elements for guiding the conductors, depending on the number of conductors to be inserted. After their entry on their entry end 22, these grooves extend through a 90° arc so that they then emerge once again at a right angle to their entry direction. On their exit end 23, the grooves 19 to 21 have cross section reductions 24 to 26, with a cross section that is adapted to the profile of the compressed conductor ends 7. As a result, an exact guidance of the conductor ends on the exit end is assured along with an exact association with a fixed spacing from one another. In lieu of the grooves, cams can also be provided for guiding the conductors, which then produces a more intensive enclosure of the conductors with plastic.

The region in which the cross section reductions 24 to 26 are disposed constitutes a part of a closing intermediary piece 27, which transitions into a narrow end of the securing frame in a U-shaped bracket 28, which for its part, then transitions into a limiting piece 29, which runs parallel to the intermediary piece 27. Recesses 30 are disposed in this limiting piece on its side oriented toward the intermediary piece 27, for example in the form of an extended groove with the cross section of the cross section reductions 24 to 26. These recesses are disposed in the axial extension of the exit direction of the conductor ends from the regions of the cross section reductions 24 to 26. Completed with corresponding recesses 31 in a second part of the limiting piece, which is disposed on a securing part 32, these recesses 30, 31, respectively form blind holes which are used for fixing the position of the outermost ends of the conductor ends 7 and 8, and are used at the same time as a stop for the exit length of the conductor ends 7 and 8. Divergent from the embodiment shown in the FIG. 2, the limiting piece can be exclusively a part of the securing frame. If need be, in this case, the recesses 30 are open both in the axial direction of the conductor ends and on an end that is disposed crosswise to it.

The securing part 32 mentioned is connected to the securing frame by means of three folding plastic hinges 33 between the other narrow end of the securing frame and the corresponding narrow end of the securing part. With the aid of these hinges, the securing part can be folded over the securing frame in such a way that the face that is visible in FIG. 2 is closed. This process can be seen in FIG. 4 as a view of the upper narrow end of the securing frame from FIG. 2.

There are also securing elements disposed in the securing frame that are embodied for example as grooves 34 to 36 and supplement the securing elements of the securing frame. They correspond to the grooves 19 to 21 and when the securing part 32 is covered by the securing frame 18, constitute guide conduits for the electrical conductors in such a way that after the two parts 18 and 32 are folded together, the electrical conductors assume a secured position inside the grooves. Also, the grooves 34 to 36 inside the securing part 32 in turn have cross section reductions 37 to 39 with which the conductor ends 7 and 8 are encompassed on all sides and are held securely in a predetermined position after the securing frame and securing part are folded together. These cross section reductions can also be used to secure the axial position of the conductors in the securing part. Furthermore, the securing part also has a U-shaped bracket 41 and a limiting piece 42, which has the recesses 31. Analogous to the limiting piece 29 and the U-shaped bracket 28, when the securing parts 32 and 18 are folded together, they rest congruently against each other. The region in which the cross section reductions 37 to 39 are situated in turn forms a part of an intermediary piece 43, which together with the intermediary piece 27, forms a common intermediary piece when the parts are folded together, and the limiting pieces 29 and 42 also form a common limiting piece. In this manner, the conductors and the conductor ends as well as their outermost end faces are securely fixed ahead of time in their position inside the recesses 30, 31. Furthermore, detent means are provided at various points on the securing frame 18 and the securing part 32, which means are not shown here in detail, preferably in the peripheral region remote from the folding plastic hinges, in order to permit a detent connection of the securing part 32 and the securing frame 18 with each other in the folded together position, thus permitting a subsequent injection molding process with plastic without position changes of the conductors. Still further securing parts can be disposed on the securing frame 18 or also on the securing part, e.g. the securing part 45, which is connected to the upper end face of the securing frame 18 via folding plastic hinges 46. This securing part can also have a groove 46 that corresponds to a partial groove 47 on the back side of the securing part 18 and when the securing part 45 engages in detent fashion with the securing frame 18, fixes a third conductor on this side, which can be guided for example via the grooves 36 and 21 and can emerge parallel to the conductor ends 7 and 8. This has not been realized, though, in the exemplary embodiment according to FIG. 1, but it can be optionally provided. In FIG. 3, it can be inferred how this additional securing part 15 is pivoted toward the securing frame 18.

The securing frame 18 and the securing part 32 also have through openings 49 and through bores 50. The through bore 50 is part of the through opening 11 that is shown in FIG. 1 and is used for guiding a fastening means through. In contrast, the through openings 49 permit an intensive supply of plastic in the injection molding process of the securing part and securing frame.

Finally, other guide pieces 52 to 54 are provided on the securing frame, which connect the common intermediary piece 27, 43 to the limiting piece 29, 42 and are respectively disposed on the longitudinal side of the securing frame 18, so that they run parallel to the conductor ends 7 and 8 inserted in the securing frame 18. These guide pieces in turn have through openings 56 to 58, which viewed perpendicular to the plane of the side pieces 12, 13, are disposed next to the conductor ends 7 and 8 and are used for the guided supply of connecting pieces or connecting plates of the electrical device or component. As a result, it is assured that these connections of the electrical component or device come exactly into contact with the conductor ends 7, 8 when the connecting piece 9 is positioned at the point provided for producing the connection between the electrical conductor part and the electrical conductors 1 and 2. Then, with the aid of resistance welding or by means of soldering, a perfect electrical connection can be produced between the electrical component or device and the conductors 1 and 2, by virtue of the fact that their conductor ends are welded or soldered to the connections.

To produce the injection molding 6, the prefabricated ends of the electrical conductors 1 and 2 are inserted with the securing frame 18 and the securing part 32 into a corresponding injection form. The common intermediary piece 27, 43 closes the one side of the injection form in such a way that the conductor ends 7 and 8 are reliably excluded from a subsequent injection molding process. A further seal in the injection molding tool is disposed at the entry of the line 1 and 2. The seal is likewise carried out here via the securing part. As a result, damage to the line insulation in the tool in prevented. The form of the injection molding also advantageously produces a guide profile 60, e.g. in the shape of a groove that runs around three sides of the injection molding 6, which can be seen in FIG. 1 only in the region of the narrow ends 16 and 17. This groove has a counterpart on the electrical component, device, or installation place of the connecting piece 19 in such a way that the connecting piece 19 can be connected in a secured position by means of an individual connecting element and in the process, the connections are also guided through the through openings 56 to 58 to the conductor ends and are secured in this position. With the aid of the guide profile and a fastening screw, for example, which is guided by means of the through opening 11, the electrical connection of the conductors 1 and 2 is adequately secured mechanically so that movements which could propagate via the covering 5 onto the injection molded part 6 do not have an effect on the electrical connection at the conductor ends 7 and 8.

To produce the electrical connection, it can be particularly advantageous that the conductor ends have a square or rectangular profile and can come to rest broadly on a correspondingly square or rectangular block profile of the corresponding connecting elements of the component. This large-surfaced connection also advantageously produces a secure connection by means of resistance welding. It must be assured that a rotation of the profile out of its optimal position is prevented since otherwise a perfect, even connection result is jeopardized. The through openings 56 can be advantageously positioned so that a certain bracing of the electrical connections toward both ends 7 and 8 can be set before the welding process.

The connection of the connecting piece 9 to its installation place can also be carried out by means of riveting or snap connecting means. All possible types of secure mechanical connecting means can be used here, where in particular guide profiles, which can also be embodied in other ways than in the exemplary embodiment shown, secure the geometric position of the connecting piece.

FIG. 5 shows a second exemplary embodiment of the invention, with a two-pole connection of electrical conductors. It can be seen here that by means of a securing frame 64 that is embodied as larger, the electrical conductors can be secured over a greater length in the grooves 119 and 120, which correspond to the grooves 19 and 20 of exemplary embodiment 1. It is also possible to accomplish a guidance of the electrical conductors not only in a single guide plane, but in a spatial guidance. To this end, the securing frame 64 has a particular securing part 65 with half grooves 220 and 219, which secure only the insulated part of electrical conductors on the entry end 122 of the securing frame 64. In the region disposed between them, the conductors can also be guided only in the half shell of the grooves 120, 119, e.g. in the 90° deflection region, and are secured by the securing part 132 only in the end region. This securing part then has corresponding half grooves 320 and 319, which after the securing frame 64 and securing part 132 are folded together, constitute a whole conduit for the respective conductor. As is also the case in the preceding exemplary embodiment, after being folded together, the securing part 132 and securing frame 64 form a common intermediary piece 127, 143, inside which the conductor ends 107, 108 are guided with the aid of cross section reductions 124, 125 on the securing part 64 or cross section reductions 137 and 138 on the securing part 132. Disposed opposite this, then, is the two-part limiting piece 142 and 129 of securing part 132 and securing frame 64. In lieu of the recesses 30, 31 provided in FIG. 2, complete through openings can also be formed in the limiting piece 129, 142 for the conductor ends, although it is also advantageous in this exemplary embodiment if these through openings are closed on the end face, together the recesses 130, 131 thus constitute recesses of the blind hole type. Here in turn, the guidance of the connecting pieces is also provided by means of guide pieces 152, analogous to the exemplary embodiment according to FIG. 2.

It can be seen that depending upon the position of the individual case, a particular guidance of the conductors is possible, which is fixed in advance by means of a securing frame in connection with one or a number of securing parts and a final fixing is obtained by means of injection molding. In this manner, it is possible to produce electrical connections which have a very high contact reliability and consequently assure an adequate operational reliability, for example in the rough operation of motor vehicles. The connecting means can be advantageously prefabricated in the form of electrical cable type conductors with wire strand cores and then electrically connected in a non-detachable way to the corresponding components.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A device for fixing the position of stripped conductor ends (7, 8) of electrical conductors (1, 2), which conductor ends (7, 8) are soldered or welded to electrical connections, to produce an electrical contact connection, said device includes a securing frame (18, 64) for fixing insulated regions of said electrical conductors (1, 2) in relation to each other, said securing frame is provided with securing elements (19, 20, 21, 119, 120) which fix the insulated end regions of the electrical conductors (1, 2) having electrically stripped conductor ends (7, 8), in a first partial region of their circumference ends, and said securing frame is secured to at least one securing part (32, 132), which fixes the stripped conductors in a second partial region (34, 35, 36; 319, 320) of their circumference ends, a detent for securing said securing frame in a final secured position which fixes the electrically stripped conductor ends (7, 8), in the securing frame (18, 64) and the securing part (32, 132) is provided with an injection molded part (6, 106) of plastic, which excludes molding plastic on the conductor ends (7, 8) themselves, and said securing frame has at least one through opening (49) via which the plastic can directly reach the conductor regions during the injection molding.

2. The device according to claim 1, in that the securing frame (18, 64) and the securing part (32, 132) are made of plastic and the securing part (32, 132) is connected to the securing frame (18, 64) via by at least one folding plastic hinge (33, 46), and detent elements are provided for reciprocal detent engagement.

3. The device according to claim 1, in that the injection molded part (6, 106) has guide profiles (60) for aligning and positionally securing the injection molded part (6, 106) to the electrical component or device or its receptacle.

4. The device according to claim 3, in that the guide profiles (60) are comprised of a groove that runs around the injection molded part on three of its sides and lies in a plane that extends crosswise to the longitudinal direction of the conductor ends (7, 8) that emerge from the injection molded part.

5. The device according to claim 3, in that the injection molded part (6, 106) has a through opening (11, 50) for guiding a fastening means through, the injection molded part which is fixed in the final position on the electrical component or device or its receptacle.

6. The device according to claim 5, in that the guide profiles (60) are comprised of a groove that runs around the injection molded part on three of its sides and lies in a plane that extends crosswise to the longitudinal direction of the conductor ends (7, 8) that emerge from the injection molded part.

7. A process of electrically connecting two electrical components or devices to each other by means of separate flexible electrical conductors with each conductor including a plurality of wires, which comprises cutting each of the separate conductors to a required length to form cut ends, stripping insulation from end regions of each of said separate conductors, compressing the wires of each separate conductor ends together, laying the conductors between a pair of matching components configured to receive the conductor ends, positioning the conductor ends into a predetermined position in relation to one another which corresponds to an association with a connection for a soldering or welding process, and fixing the conductors by means of an injecting molding with plastic without injection molding the compressed ends of each separate conductor for fixing the conductors in the predetermined position and to form an injection molded part, inserting the end regions of the conductors into a securing frame provided with position fixing means and are fixed in the securing frame by means of at least one additional securing part that engages in a detent fashion with the securing frame, injection molding said securing frame and securing part with plastic in an injection molding tool, in order to achieve a final fixing of the predetermined position of the conductor ends without injection molding the separate conductor ends, and welding or soldering the compressed conductor ends to corresponding electrical connections of said electrical components or devices to which the conductor ends are to be connected.

8. The process according to claim 7, which comprises positioning the conductor ends fixed in the injection molding into a contacting position with an electrical connection on the electrical components or devices and producing a long-lasting electrical connection by means of the soldering or welding process, and fastening the injection molded part to the electrical components or devices by a fastening means.

9. A process of electrically connecting two electrical components or devices to each other by means of separate flexible electrical conductors with each conductor including a plurality of wires, which comprises cutting each of the separate conductors to a required length to form cut ends, stripping insulation from end regions of each of said separate conductors, compressing the wires of each separate conductor ends together, laying the conductors between a pair of matching components configured to receive the conductor ends, positioning the conductor ends into a predetermined position in relation to one another which corresponds to an association with a connection for a soldering or welding process, and fixing the conductors in this position by means of an injecting molding with plastic to form an injection molded part without injection molding the compressed ends of each separate conductor, and positioning the conductor ends fixed in the injection molding into a contacting position with an electrical connection on the electrical components or devices and producing a long-lasting electrical connection by means of the soldering or welding process, and fastening the injection molded part to the electrical components or devices by a fastening means.

10. A device for fixing the position of stripped conductor ends (7, 8) of electrical conductors (1, 2), which conductor ends (7, 8) are soldered or welded to electrical connections, to produce an electrical contact connection, said device includes a securing frame (18, 64) for fixing a first position of the conductors (1, 2) in relation to each other, said securing frame is provided with securing elements (19, 20, 21, 119, 120) which fix end regions of the electrical conductors (1, 2) having the conductor ends (7, 8), in a first partial region of their circumference ends, and said securing frame is secured to at least one securing part (32, 132), which fixes the conductors in a second partial region (34, 35, 36; 319, 320) of their circumference ends, a detent for securing said securing frame in a final secured position which fixes the conductor ends (7, 8), in the securing frame (18, 64) and the securing part (32, 132) is provided with an injection molding (6, 106) of plastic, which excludes molding plastic on the conductor ends (7, 8) themselves, and the securing elements are embodied in the securing frame and/or in the securing part, in the form of a groove (19, 20, 21; 119, 120; 34, 35, 36; 319, 320), whose cross section is adapted to a cross section of the conductors (1, 2).

11. The device according to claim 10, in that at least the securing frame (18, 64) has additional securing elements (24, 25, 26; 37, 38, 39; 124, 125; 137, 138; 30, 31; 130, 131), with which an axial position of the ends of the conductor ends (7, 8) are fixed.

12. The device according to claim 10, in that the securing frame (18, 64) and the securing part (32, 132) constitute a common intermediary piece (29, 42) which is penetrated by only the conductor ends (7, 8) at commonly formed through openings (24, 25, 26; 37, 38, 39).

13. The device according to claim 12, in that opposite the common intermediary piece (29, 42), a limiting piece (29, 42; 129, 142) is provided which is connected to the securing frame (18, 64) and/or to the securing part (32, 132) and has recesses (30, 31; 130, 131) for fixing the conductor ends (7, 8).

14. The device according to claim 13, that the axial position of the conductor ends (7, 8) is additionally fixed by means of the recesses (30, 31; 130, 131) on the limiting piece (29, 42; 129, 142).

15. The device according to claim 13, in that the common intermediary piece (27, 43, 127, 143) is connected to the limiting piece (29, 42; 129, 142) via a U-shaped bracket (28), which determines the distance of the pieces (27, 43, 127, 143, 29, 42; 129, 142) from one another and consequently determines the length of the conductor ends (7, 8) freely available for connection.

16. The device according to claim 13, in that in addition, guide pieces (52, 53, 54; 152), which are each associated with one conductor end (7, 8), are provided between the securing frame (18, 64) or securing part (32, 132) and the limiting piece (29, 42; 129, 142) and have through openings (56, 57, 58) through which the electrical connections are guided crosswise to the conductor ends (7, 8), into their final position for their connection with the conductor ends.

* * * * *